US006858280B2

(12) United States Patent
Allen et al.

(10) Patent No.: US 6,858,280 B2
(45) Date of Patent: Feb. 22, 2005

(54) MICROSPHERE INSULATION SYSTEMS

(75) Inventors: Mark S. Allen, Lakewood, CO (US); Gary S. Willen, Boulder, CO (US); Robert A. Mohling, Boulder, CO (US)

(73) Assignee: Technology Applications, Inc., Boulder, CO (US)

( * ) Notice: Subject to any disclaimer, the term of this patent is extended or adjusted under 35 U.S.C. 154(b) by 0 days.

(21) Appl. No.: 10/377,085

(22) Filed: Feb. 26, 2003

(65) Prior Publication Data

US 2003/0203149 A1 Oct. 30, 2003

Related U.S. Application Data

(60) Provisional application No. 60/359,734, filed on Feb. 26, 2002.

(51) Int. Cl.$^7$ .................................................. B32B 1/02
(52) U.S. Cl. .......................................... 428/69; 428/69
(58) Field of Search ................................. 428/69, 36.9

(56) References Cited

U.S. PATENT DOCUMENTS

| | | | |
|---|---|---|---|
| 3,769,770 A | 11/1973 | Deschamps, et al. | 52/404 |
| 4,303,730 A | 12/1981 | Torobin | 428/333 |
| 4,303,732 A | 12/1981 | Torobin | 428/333 |
| 4,415,512 A | 11/1983 | Torobin | 264/9 |
| 4,459,145 A | 7/1984 | Elsholz | 65/21.3 |
| 5,713,974 A | 2/1998 | Martin | 65/17.2 |
| 2002/0004111 A1 | 1/2002 | Matsubara et al. | 428/34.4 |

FOREIGN PATENT DOCUMENTS

| | | |
|---|---|---|
| EP | 0012038 A1 | 12/1979 |
| EP | 1172341 A1 | 1/2002 |

OTHER PUBLICATIONS

Allen, M.S. et al., Advances in Microsphere Insulation Systems, Cryogenic Engineering Conference, Sep. 22–26, 2003, 1–8.

Dube, W.P. et al., Thermal conductivity of evacuated perlite at low temperatures as a function of load and load history, Cryogenics 31:3–6, Jan. 1991.

Flynn, T.M., *Cryogenic Engineering*, Dekker, New York, NY, Dec. 1997, pp. 390.

Issa, C.A. et al., Structural effects of perlite compaction on cryogenic storage vessels subjected to thermal cycles and vibrations, Int. J. Pres. Ves. & Piping 64:51–65, Dec. 1995.

Edeskuty, F.J. et al., *Safety in Handling Crygenic Fluids*, Plenum Press, New York, NY, Dec. 1996, pp. 38–41.

Flynn, T.M., *Cryogenic Engineering*, Dekker, New York, NY, 1997, pp. 387–388.

Aerogel Microspheres [online]. Lawrence Livermore National Laboratory, 2000 [retrieved on Feb. 18, 2003] Retrieved from the Internet: <URL:www.llnl.gov/lPandC/op96/07/7c–aer.html>.

Parmley, Microsphere Insulation Systems, *Applications of Cryogenic Technology*, vol. 8, Oct. 14, 1975, pp. 161–167.

Polysciences' Microspheres. Polybead Microparticles [online]. Polysciences Europe GmbH, 1999 [retrieved on Feb. 18, 2003]. Retrieved from the Internet: <URL:www.polysciences.de/spheres.html>.

Reinker, R.P.; et al., "Thermal Conductivity and Diffusivity of Selected Porous Insulations Between 4 and 300 K," *Advances in Cryogenic Engineering*, vol. 20, Plenum Press, New York, NY, 1975, pp. 343–354.

*Primary Examiner*—Alexander S. Thomas
(74) *Attorney, Agent, or Firm*—Greenlee, Winner and Sullivan, P.C.

(57) ABSTRACT

A new insulation system is provided that contains microspheres. This insulation system can be used to provide insulated panels and clamshells, and to insulate annular spaces around objects used to transfer, store, or transport cryogens and other temperature-sensitive materials. This insulation system provides better performance with reduced maintenance than current insulation systems.

5 Claims, 8 Drawing Sheets

MICROSPHERE INSULATION SYSTEMS

CROSS-REFERENCE TO RELATED APPLICATIONS

This application takes priority from U.S. provisional application Ser. No. 60/359,734, filed Feb. 26, 2002, which is incorporated herein by reference to the extent not inconsistent with the disclosure herewith.

ACKNOWLEDGEMENT OF FEDERAL RESEARCH SUPPORT

This invention was made, at least in part, with funding from NASA under contracts NAS10-01008, NAS10-02013, and NAS10-03016. Accordingly, the U.S. government may have certain rights in this invention.

BACKGROUND OF THE INVENTION

Insulation of transfer lines and storage vessels for cryogens and other temperature-sensitive materials is required to prevent transfer and storage losses, and to reduce other economic losses such as maintenance and replacement costs.

Currently transfer line insulation can be grouped into three general categories: vacuum-jacketed multilayer insulation (MLI), powders (e.g., perlite), and solid foams (e.g., polyurethane). Vacuum-jacketed lines with MLI have the lowest heat leak; however, they have high initial cost and require periodic vacuum maintenance. Evacuated powder insulation is less expensive, but has lower thermal performance, and therefore is not generally used for transfer line insulation. Polyurethane foam insulation is used on many large cryogenic transfer lines because of its low initial cost and relative ease of installation. However, it has a much higher heat leak than evacuated MLI and is subject to severe degradation from repeated thermal cycling and environmental exposure.

Foam insulation degradation is often associated with cracking that expose portions of the cold surface to the ambient air. This causes oxygen-enriched air to form, creating a severe fire hazard. In the case of liquid hydrogen lines, liquid air, rich in liquid oxygen, will stream off the exposed surfaces. In addition, foams are not oxygen compatible and can burn in an oxygen rich environment. For these reasons, foam insulation should be avoided where personnel are working, and is unsuitable for manned space applications such as reusable launch vehicles.

The fabrication of microsphere particles from various components is known (see, for example, U.S. Pat. Nos. 4,459,145; 4,415,512; 4,303,732; 4,303,730; United States application 2002/0004111; European Patent application EP 1172341). U.S. Pat. No. 3,769,770 (Nov. 6, 1973) describes an arrangement of spheres individually coated with a material such as nickel for use as a thermal barrier for extremely high temperature applications. U.S. Pat. No. 5,713,974 (Feb. 3, 1998) describes the use of evacuated microspheres in an insulating coating such as an elastomeric roof coating. Parmley investigated the use of 80 $\mu$m diameter hollow borosilicate glass spheres at a pressure of $10^{-5}$ mm Hg as an insulator of a stainless steel jacket hemisphere formed from a flat piece of stainless steel (Parmley, Microsphere Insulation Systems, Applications of Cryogenic Technology Vol. 8, Oct. 14, 1975, pp. 161–167). This system was found to be too expensive.

An insulation system that combines ruggedness, low mass, ease of application (including field installation), good thermal performance, low life-cycle cost, safety, and little or no maintenance is needed. The current technologies are either expensive (evacuated MLI) or degrade quickly (polyurethane foam). In addition, current technologies are maintenance intensive to retain the original performance level.

SUMMARY OF THE INVENTION

A new insulation system comprising a form filled with microspheres is provided. In separate embodiments, the form may be evacuated or back-filled with a gas. Alternatively, the form may be used after filling with microspheres without evacuation or back-filling. Evacuation of the form increases the insulation value. Back-filling the form with a gas such as argon, nitrogen or carbon dioxide increases the insulation value as compared to ambient. It is preferred that a dry gas be used for back-filling to reduce the effects of moisture on the insulation system.

In one particular embodiment the insulation system comprises sealed, preferably air-tight, panels filled with microspheres. In another particular embodiment the insulation system comprises sealed, preferably air-tight, curved forms filled with microspheres. In another particular embodiment the insulation system comprises sealed, preferably air-tight, flexible forms filled with microspheres. Another embodiment is the use of microsphere particles to fill an annular space around or partially around an object. As used herein "annular" means the space between a wall of an object to be insulated and a surrounding material that can be used to contain insulation material. The space can be filled with microspheres and evacuated, as described herein, or the annular space may remain at ambient pressure. It is preferred that the annular space be pre-existing, such as surrounding a storage vessel. In all embodiments, the forms may be optionally evacuated or back-filled with a gas.

As used herein, "evacuated" means pressure below ambient. Any pressure below ambient is considered evacuated. By evacuating the form, gaseous conduction is greatly reduced. Any level of evacuation may be used, depending on the preferred insulation level. Some example pressures include less than 760 mm Hg, less than 1 mm Hg, less than 0.1 mm Hg, less than $10^{-3}$ mm Hg, less than $10^{-5}$ mm Hg and all individual values and ranges therein. The form may be evacuated or back-filled after filling with microspheres to reduce any interference with filling.

As used herein, "filled" means substantially all the open space in the form contains microspheres (there are preferably no channels or other continuous spaces that would prevent the insulation system from fulfilling at least one of the functions outlined herein, for example), but does not prevent the use of materials such as tubes or a honeycomb-type core to obtain or maintain the desired pressure inside the form or provide structural support.

As used herein "microspheres" or "microsphere particles" or "particles" means hollow bubbles or beads that help to reduce thermal conduction. Microspheres are in the size range 0.1 to 500 $\mu$m and all individual values and ranges therein. Any material that has a low apparent thermal conductivity and can be formed into a shape that allows point contact can be used as the microsphere material, such as ceramics, aerogels, silica and polymers (such as polymer microspheres from Polysciences). It is preferred that glass is used as the microsphere material. Some examples of microsphere particles that may be used include 3M™ Scotchlite™ Glass Bubbles and other particles that fulfill the same functions as the particles described herein. The microsphere particles in the form shell can provide structural support for the form shell can and reduce heat transfer through reflection and scattering. Solid conduction is minimized because the microsphere particles make only point contact with each other.

As used herein, "form" indicates any contained area to be filled with microspheres. Various sizes, shapes and diameters of forms are known to one of ordinary skill in the art, and are intended to be included in the invention. The dimensions of the form are ordinarily determined by the intended application. Any shape may be used, including square, rectangular, triangular, circular, oval, or other shapes, including irregular shapes. The form may be rigid or flexible. The form may be a panel or curved to surround a pipe, for example. As used herein, "panel" means a form with substantially parallel front and back. The form may be an area formed by an object to be insulated and a surrounding jacket, for example surrounding a storage vessel. The dimensions of the form are not limited as long as the form has sufficient strength and provides sufficient insulating power for the intended application. For insulating pipes and other cylindrical objects, sections may be butted together to surround the pipe or object. For example, two 180 degree sections may be used, or three 120 degree sections, or any other suitable configuration. The form may also be a malleable form that is able to be shaped as desired before or after filling with microsphere particles.

The form frame is made using any suitable material. For example, stainless steel front and back portions may be used, along with fiberglass sides, bonded together with a suitable material, such as epoxy or other adhesives known to the art. Also, flexible hermetic barrier materials, as known in the art, may be used for the form frame. The panels may be a vacuum-tight envelope employing thin skins of stainless steel or composites. The thickness of the front and back portions, as well as the side portions is not limited, as long as the form has performance (strength and thermal properties) sufficient for the intended application. The microspheres are load bearing, so a panel may be wrapped with flexible material or use a very thin form frame. The form may include ports for evacuating the form and filling the form. These ports are known in the art and the use and selection of such ports are well within the skill of one of ordinary skill in the art.

The form shell is filled with particles that are generally spherical in shape to provide point contact with each other. The particles must not be so large as to have large channels for thermal transfer between the particles. The size distribution of particles that can be used in the invention is varied. For example, particles with a random size distribution may be used. Alternatively, particles that are all the same size as determined using standard sizing techniques may be used. These same size particles are termed "uniformly sized". Alternatively, particles having size distribution ±50 $\mu$m around a central diameter may be used. Alternatively, particles having size distribution ±100 $\mu$m around a central diameter may be used. One particular distribution is particles with 10 to 200 $\mu$m diameters. The preferred size for each application is determined by the cost and desired insulation values as known in the art. An appropriate size of particles is easily determined by one of ordinary skill in the art. The microsphere particles used in the interior of the form may be of the same material, or different materials. All of the particles or some portion of the particles inside the form may be coated with a material to reduce radiation heat transfer, or a separate opacifier material, including opaque or semi-opaque microspheres may be added to reduce radiation heat transfer.

DETAILED DESCRIPTION OF THE INVENTION

The invention may be further understood by reference to the following non-limiting examples, description and figures, where like numbers indicate like features.

The microsphere insulation system offers the ability to fabricate lightweight insulation systems that can be produced in complex shapes for aerospace and other applications including high efficiency storage vessels and transfer lines, along with flat or curved panels for operation at a wide variety of temperatures. The load bearing capability allows the performance of vacuum insulation without heavy self-supporting vacuum jacketing.

The insulation system may be used in a variety of operating pressure and temperature conditions, including ambient and reduced pressure. The selection of pressure required is determined by the level of insulation desired in a given application, and is easily determined without undue experimentation by one of ordinary skill in the art. Some applications for this invention include insulation of cryogenic transfer lines and storage vessels, and non-cryogenic refrigerators/freezers, ovens, and shipping containers, including medical shipping containers for donor organs and vaccines, and food shipment. In addition, microsphere insulation systems may be used in weight-critical airborne and spaceborne systems. Microsphere insulation systems may also be used for applications that include ambient and high temperature ranges. The microsphere insulation system provides incombustibility, high temperature capability, improved thermal performance, and the ability to create flexible panels. Other uses are known to one of ordinary skill in the art without undue experimentation.

The microsphere insulation system addresses the problem of compaction settling encountered using other powder insulation systems, such as perlite, during repeated thermal cycles and excessive water absorption with accompanying vacuum pump down difficulties while offering better thermal performance and lower vessel insulation weight than other powder insulation systems.

Figure 8:
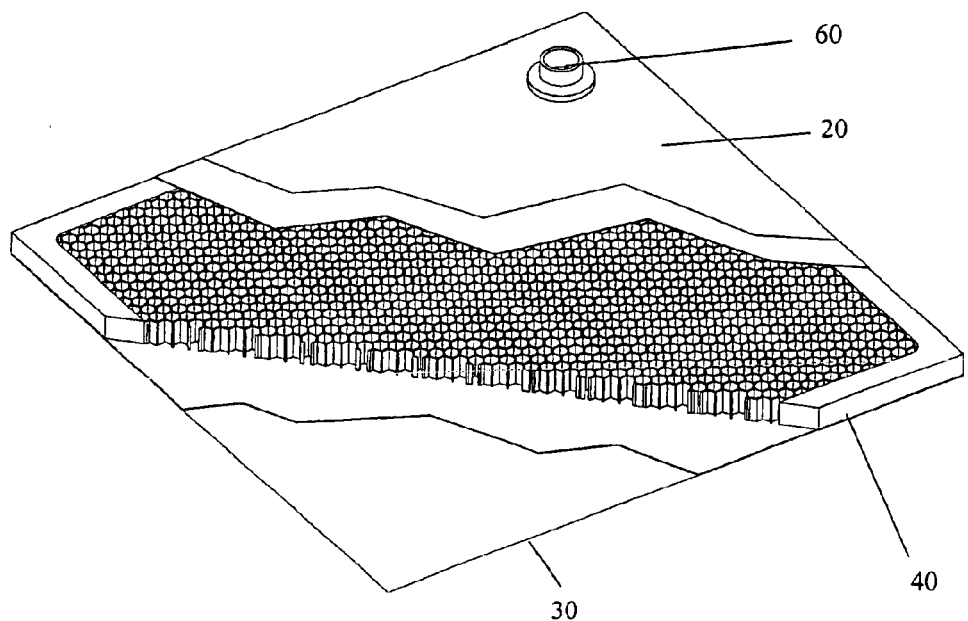
FIG. 8 shows a honeycomb panel.

The microsphere insulation system configuration provides several advantages over existing insulation systems. Microspheres are not only an exceptional insulator, but are also load bearing and have low bulk density. The face sheets can be thin and the system materials can be chosen for the specific application. The preferred face sheet material is dependent on the desired application and its selection is well within the skill of one of ordinary skill in the art. Some examples of materials for use as face sheets include stainless steel, aluminum, fiberglass, and Invar. Stainless steel is corrosion resistant, is tough, and is the same material used in the fabrication of cryogenic tanks and transfer lines that benefit from using the microsphere insulation system. Aluminum and fiberglass are light, while Invar has low thermal expansion. Top and bottom face sheets can be different materials to best match the operational conditions on each side of the microsphere insulation system. Edge material and shape can be adapted to application requirements as well. Fiberglass is one example of material used as edge material. Fiberglass is light, is strong, has low thermal conductivity, and bonds especially well. Less rigid edge designs such as thin stainless steel or an open framework edge design covered with a flexible vacuum barrier material can be used as well because of the load bearing capability of the microspheres. Honeycomb designs, such as that shown in FIG. 8 can be used. The honeycomb design allows a damaged area to be confined to prevent all the microspheres from spilling out of the form from a puncture or other damage. All such design modifications are well within the skill of one of ordinary skill in the art.

Glass bubbles, such as 3M™ Scotchlite™ Type K1 Glass Bubbles, are the preferred choice for the microsphere insulation system bulk insulation material. The actual bulk density is only 0.064 g/cc (true density of individual spheres is 0.125 g/cc). The crush strength of the Type K1 microspheres is 1.7 MPa, more than an order of magnitude above atmospheric pressure. The microspheres are noncombustible. Some amount of aluminum coated microspheres, such as 10 to 50% by volume or other suitable amount easily determined by one of ordinary skill in the art may be included to reduce radiation heat transfer. The use of a more common opacifier such as metallic flakes or carbon black is desirable for certain applications. Inclusion of opaque or semi-opaque microspheres may also be used as an opacifier.

Figure 2:
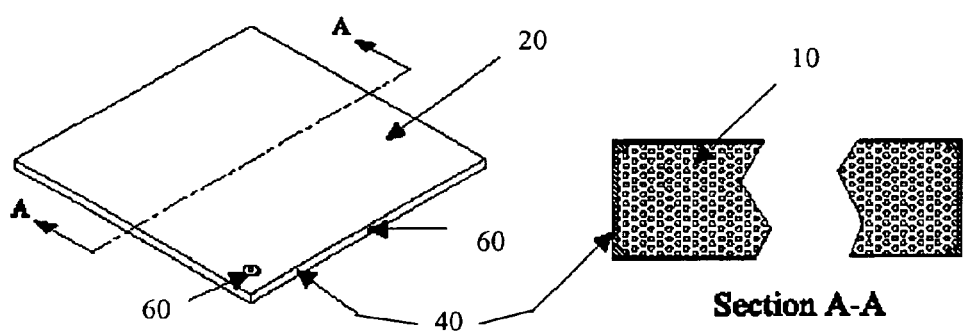
FIG. 2 shows a flat panel.
Figure 3:
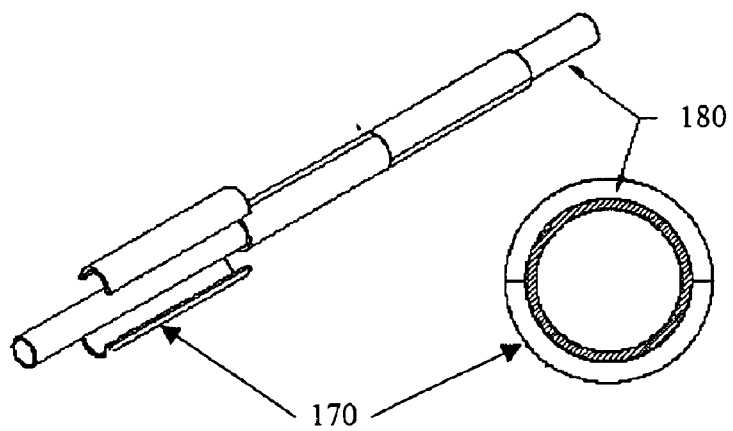
FIG. 3 shows a curved panel.

One embodiment of the microsphere insulation system consists of microsphere panels that are vacuum tight and can be configured to fit any shape. FIG. 2 illustrates the construction of a flat panel; FIG. 3 shows a curved panel (170), typical of a configuration that is used to insulate a cryogenic transfer line (180). The panel face sheets are preferably made from thin stainless steel or aluminum sheets; the edges are preferably constructed from low thermal conductivity fiberglass to minimize heat conduction. The interior of the panel is filled with microspheres between the two face sheets. In FIG. 3, two clamshell sections are used to insulate line (180). In most applications, short sections of panels will be joined to span the desired distance of line (180). Three such sections are shown in FIG. 3. It is preferable that sections do not have adjacent seams, as shown in FIG. 3. The thermal performance of the insulation panel through the microspheres is calculated using a relationship developed by Parmley (Microsphere Insulation Systems, *Applications Of Cryogenic Technology*, Vol 8, Oct. 14, 1975).

$$k = (1 + P^{0.62})[2.48 \times 10^{-8}(T_H)(1 + \theta) - 2.07 \times 10^{-11}(T_H)^2(1 - \theta)/(1 - \theta)] + 3.43 \times 10^{-4}\theta(T_H)^3(1 + \theta)(1 + \theta^2),$$ Solid conduction Radiation (1)

where: $k = W/m - K$   $P = N/m^2$
$\theta = T_C/T_H$   $\sigma = 5.67 \times 10^{-8} W/m^2 - K^4$
$T_H = K$ The primary components of one embodiment of microsphere insulation system panels, whether flat or curved, are more particularly shown in FIG. 1. The bulk microsphere insulation material (10) is contained within a panel envelope formed by top (20) and bottom (30) face sheets bonded to preferably low thermal conductivity edges (40) using an adhesive such as a cryogenic grade structural epoxy that forms a vacuum-tight bond. Evacuation and fill ports (60) are located at opposite ends of the microsphere insulation systems and are preferably inset into the top face sheet for protection, but that is not required. Other configurations of evacuation and fill ports are known in the art. In one configuration, valves are connected to the form using tubing, so that the valves are not integrally part of the form. In another configuration, there are no valves—the form is evacuated in a vacuum chamber. For example, a microsphere insulation system that is enveloped with a heat-sealable vacuum barrier film can be hermetically sealed in a vacuum chamber after evacuation. This procedure is known to one of ordinary skill in the art.

Another embodiment is the use of the microsphere insulation system around complex shapes such as valves, instrumentation and support braces. A flexible bag made from polyester laminate film or other suitable material can be used in this application. In addition, preformed cuffs or strip type bags may be employed. As long as the material used keeps the microspheres in the interior of the form, and allows evacuation or back-filling with gas and acts as a vapor barrier, any material may be used for the flexible bag. The bag may be filled with microspheres, then formed around the object to be insulated, and then optionally evacuated or back-filled with gas before, during or after forming. Alternatively, the bag may be fitted or formed around the object to be insulated, then filled with microspheres, and then optionally evacuated or back-filled with gas before, during or after forming. It may be preferable in a desired application, for example outdoors, for the form material to be UV-light resistant. These embodiments are formed as described herein.

The bulk-fill nature of the microspheres allows for easier and lower-cost fabrication of vacuum jacketed transfer lines than current technologies. The free-flowing ability of the microspheres allows fast insulation of elbows and expansion joints and other shapes. Unlike MLI, microsphere insulation occupies the entire annular volume between the inner line and outer jacket, which provides for an effectively thicker insulation layer than MLI. The time-consuming process of wrapping expensive MLI is replaced with the fluid-like microsphere filling procedure.

Figure 4:
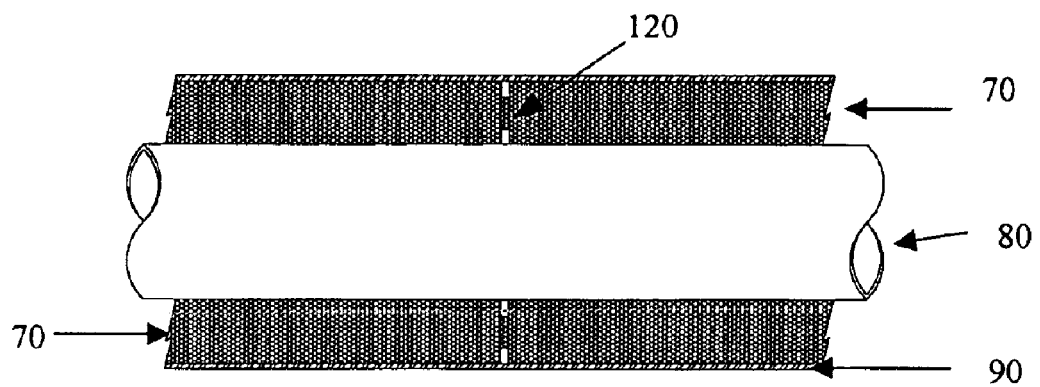
FIG. 4 shows a side view of a transfer line application.

FIG. 4 shows one embodiment of using the microsphere insulation system to insulate a transfer line. Microspheres are transferred into the annular space (70) between the inner line (80) and jacket (90) that are concentrically spaced with spacers if desired or necessary, such as with low thermal conductivity, open-webbed spacers (120) as shown in FIG. 4. The form is then optionally evacuated or back-filled.

Figure 5:
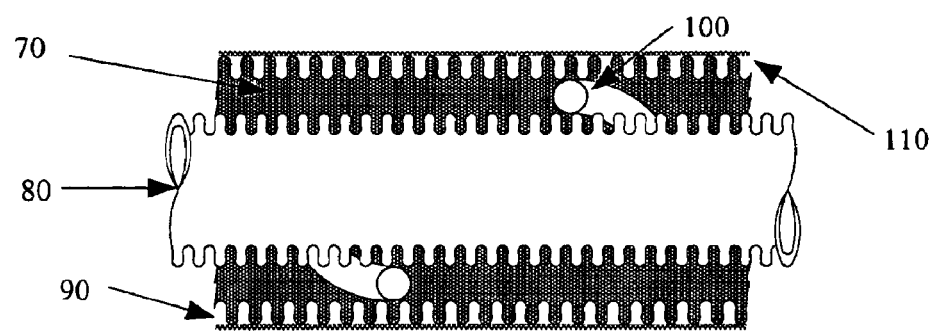
FIG. 5 shows a side view of a transfer line application using corrugated tubes.

A similar approach, illustrated in FIG. 5, can be used for flexible vacuum-jacketed transfer lines fabricated from corrugated tube. In FIG. 5, the corrugated tube is surrounded by a wire braid (110) to provide structural support. A spiral-wrapped, or other shape, spacer (100) maintains concentricity and prevents compressive loads from being carried through the insulation, which will allow the heat leak to be similar to that of rigid transfer lines, instead of increasing by about a factor of three as typically occurs in MLI-insulated flexible transfer lines.

Using MLI, the performance degrades rapidly as the vacuum quality decays. Using microsphere insulation, the performance does not degrade as rapidly as MLI when the vacuum quality decays. This means much less vacuum maintenance needs to be performed on the transfer lines. Even if the vacuum in a segment is lost, that length will have thermal performance comparable to foam insulation, and the overall insulation performance will not be catastrophically impacted.

Some applications are insulation of various size transfer lines, such as 1- to 10-in pipes for transfer of such cryogens as oxygen, nitrogen, hydrogen, helium, argon, and liquefied natural gas.

Figure 6:
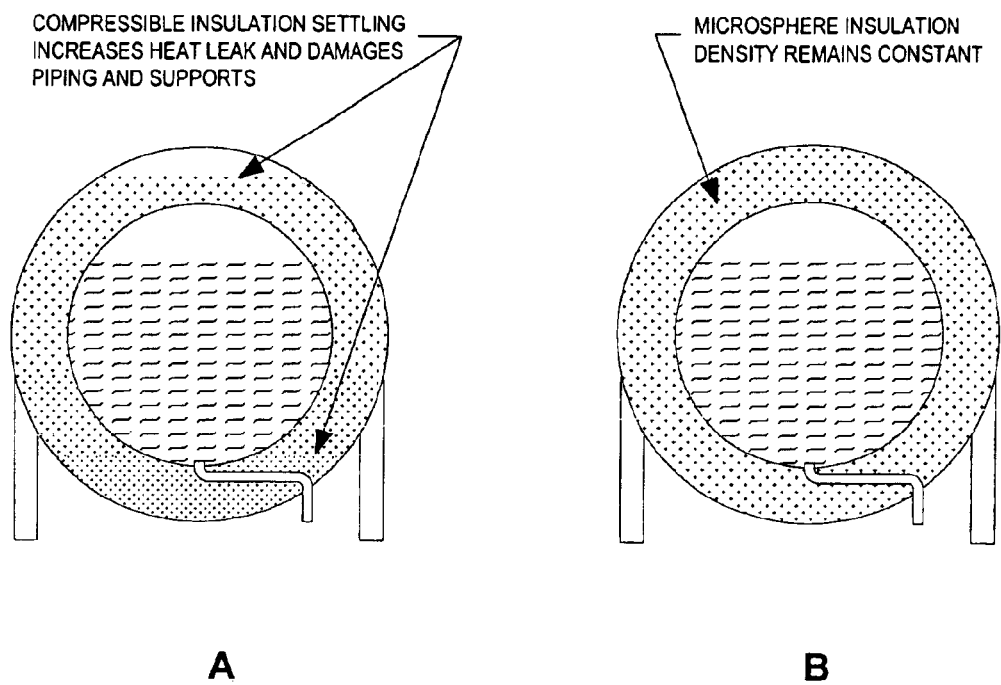
FIG. 6(A and B) shows compaction of bulk powder insulation surrounding an object.

Another embodiment is the use of microspheres to insulate the annular space around a storage dewar or other vessel. Microspheres are a superior bulk powder insulation material for cryogenic storage dewars, particularly if the dewars are large. Microsphere insulation provides several key advantages over currently-used perlite insulation, including improved initial and long-term thermal performance and the potential elimination of the almost inevitable need to reinsulate the vessel due to compaction to maintain cost-effective operation. Compaction occurs when compressible bulk powder insulation settles under the inner vessel during thermal expansion cycles, as depicted in FIG. 6. In FIG. 6A, the density of compressible bulk powder insulation is shown as higher near the bottom of the inner vessel and lower as one moves up the inner vessel. In FIG. 6B, microsphere insulation is shown, and the density gradients do not develop. The compaction increases heat leak to the inner vessel and can damage internal piping and supports. Microsphere insulation's inherent properties of high crush strength and ability to flow combine to prevent the compaction problem and structural damage from occurring.

The presence of moisture in insulation materials substantially extends vacuum pump down time and limits the attainable vacuum quality, and, therefore, the thermal performance. Hygroscopic materials (particularly perlite) must be dry at installation and never exposed to moisture during the service life because proper vacuum level will not likely be achievable, especially if the inner and outer vessels cannot be heated during evacuation. Microsphere insulation is hydrophilic and therefore pumps down faster than perlite.

Using the microsphere insulation systems described herein, stationary storage tanks or other dewars can be insulated. In two embodiments, vertical or horizontal liquid (such as liquid hydrogen) storage vessels that have an inner vessel suspended within an outer jacket with an annular space between are insulated with microspheres. The microspheres are poured into the annular space and the space evacuated using techniques known in the art and described herein to form the microsphere insulation system.

Another embodiment is the use of the microsphere insulation system to insulate transportable tanks that carry temperature—sensitive fluids including cryogens from one place to another. The present invention is preferably directed toward insulating pre-existing annular spaces or forming autonomous insulation panels.

Flat Panel Fabrication Example

An 8-in square panel with a 1-in thick layer of microspheres is made using the following procedure. The microspheres are enveloped by thin stainless steel face sheets and fiberglass frame edges. The face sheets, edges, and ports (fill and vacuum) are bonded together with cryogenic grade epoxy that preferably remains vacuum tight during all operational conditions.

Figure 1:
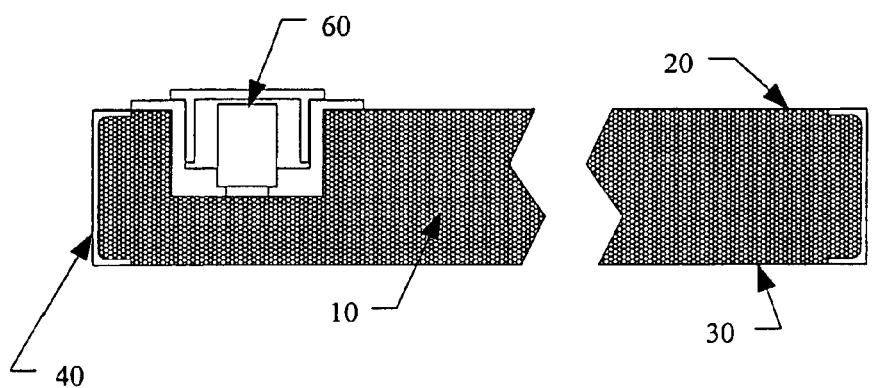
FIG. 1 shows primary components of one embodiment of the microsphere insulation system.

The 1-in tall edges have a C-channel shaped cross-section, similar to that shown in FIG. 1, that provides ¼-in wide bonding surfaces on the flanges and a thin web in the vertical plane that has thinner relief areas to further reduce heat transfer between the ambient and cold face sheets. The edges are machined from common G-10 fiberglass ¼-in plate so that the glass fabric layers are in the vertical plane. This provides improved shear strength in the horizontal plane to withstand the thermal expansion stresses that exist when the microsphere insulation systems face sheets are at different temperatures. Any edge height can be used in conjunction with the insulation thickness of the microspheres to proportionally increase or decrease the insulation value of the microsphere insulation systems. The length and width of the microsphere insulation systems can be adjusted to match the specific application requirements.

The square face sheets are 0.007-in thick 300-series stainless steel. Stainless steel provides a tough, ductile, protective skin that has a relatively low emissivity that reduces radiation heat transfer. The thickness of 0.007-in was chosen to minimize weight. The face sheets can be made thinner or thicker, depending on the desired weight of the article and desired strength. The selection of thickness is well within the skill of one of ordinary skill in the art.

Figure 7:
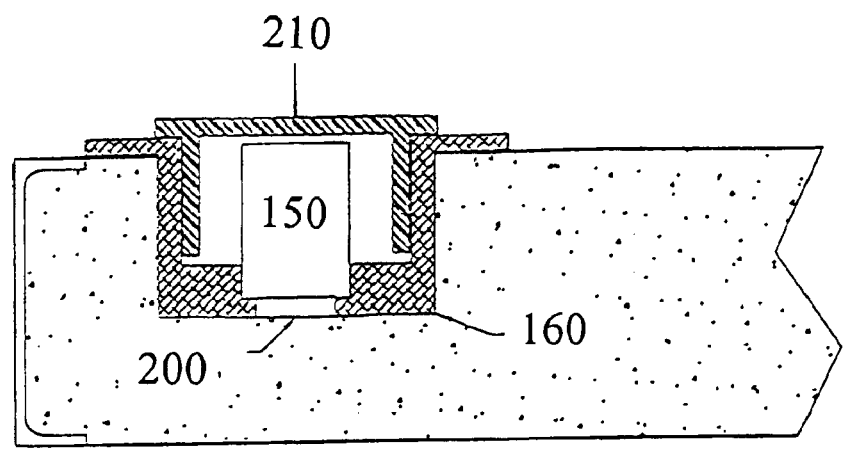
FIG. 7 shows a schematic of the valve port design.

The fill and vacuum ports are externally mounted in common vacuum components for simplicity. Both use a standard ¼-in or ½-in vacuum seal-off valve plug to provide access to the microsphere insulation system inner volume. The microspheres are transferred into the form using a HEPA filter vacuum or low-throughput vacuum pump and the form evacuated using common vacuum equipment capable of achieving $10^{-3}$ mm Hg, for example. The evacuation and fill ports are inset in the panel. This design protects them from damage. In one embodiment shown in FIG. 7, the ports are identical except for the fine mesh filter (200) on the pumpout port that prevents the bulk microsphere material from being sucked into the vacuum pump during evacuation. The assembly consists of a standard ¼-in vacuum seal-off valve (150), fiberglass adapter to minimize heat leak (160), and a protective cap (210). Adapter bonds made to the vacuum seal-off valve and to the panel skin will remain near ambient temperature and can be made with the same epoxy adhesive. FIG. 7 shows the port design schematically. Other ports may be used, as desired and known to one of ordinary skill in the art without undue experimentation. For example, the evacuation and fill ports may be located in physically different locations.

The frame edges are bonded to each other and to the face sheets using a structural epoxy mixture that has proven to be tough at cryogenic temperatures. In this example, vacuum-tight bonds between the microsphere insulation systems components were made with a mixture of Shell Epon 828 and Henkel Versamid 125. Other adhesive examples include Hysol EA9330 and E. V. Roberts RF-5407.

The epoxy adhesive used in this example combines Epon 828 resin and Versamid 125 catalyst at a ratio of 100 parts to 75 parts, respectively. Microspheres are then added 3% by volume as a filler to assure constant layer thickness and to reduce the adhesive thermal expansion coefficient to better match the parts being bonded. The mixture is vacuum degassed before application, and the assembly is cured at room temperature for 7 days to achieve the toughest bond properties. A more flexible, lower durometer, cured material results from increasing the catalyst component up to 99 parts.

The microspheres are preferably heated to 100° C. for at least 24 hours and cooled to remove adsorbed water.

Transfer Line Clamshell Panel Example

The lightweight microsphere insulation system curved panel design that is used to insulate transfer lines, and may be used to insulate cylindrical vessels, utilizes similar materials and configuration as the flat panel design, except that the preferred assembly has a 180° curved profile so that pairs of clamshells are butted together to encapsulate a section of pipe.

The curved edges at the ends of the clamshells are machined to their radial shape from G-10 plate. The longitudinal edge pieces have a layout much like flat panel edge pieces. The thin inner shell (cold face sheet) is preferably made from the same material as the pipe being insulated so that the material thermal expansion coefficients match. The thin outer shell (warm face sheet) is also preferably made from stainless steel for durability and corrosion resistance since it is usually exposed to the environment. Some alternative lightweight outer shell materials include aluminum and fiberglass.

Weight sensitive applications exposed to external atmospheric pressure can benefit from the thermal performance advantage of thin outer shells supported by microspheres. The use of intermediate stiffeners or honeycomb core to support the thin outer shell reduces solid conduction through the microspheres by eliminating the compression load imposed by the external pressure.

The clamshell design can be tailored to retrofit existing ground-based cryogenic transfer lines that were previously insulated with conventional foam. The face sheets use standard tube or pipe with a wall thickness between 0.065 in and 0.120 in to simplify fabrication by eliminating the roll-forming process. An additional advantage is that the apparent thermal conductivity though the microsphere insulation system is reduced because of the self-supporting curved shell.

For example, materials to insulate a 3-in IPS bare transfer line consist of a 4.000-in O.D.×0.120-in wall stainless tube for the panel inner surface (a gap exists between the inner panel surface and the transfer line for the interface/adhesive material) and a 6.000-in O.D.×0.065-in wall tube for the outer surface. A 0.0075-in thick adhesive layer exists between the edge flanges and the tubes, so the edge is 0.920 in tall with 0.0625-in web and flange thickness, 0.250-in flange width, and 0.125-in radii. The longitudinal edges will then be 95.50-in long and just butt to the circumferential edges (not mitered) for a 96.00-in panel length.

Permanent bonding of the microsphere insulation system panels to substrates may employ Composite Technology Development (CTD) CryoBond™ 620 and 920 materials. A uniform thickness of adhesive can be sprayed on the pipe, with the microsphere insulation system then pressed in place forming a uniform, sealed bond. Filling and sealing of the gaps between panels may use a CTD material or something more flexible such as a silicone sealer, open-cell foam, or dense fiberglass batting.

Alternatively, a band, such as a metallic or plastic material of spiral or circumferential configuration, may be used to hold the microsphere insulation system components in place around the object to be insulated and to provide a moisture barrier for the joints. Other methods of holding the microsphere insulation system components in place may be used, as known in the art.

Other approaches of attaching the microsphere insulation system to the pipe are available. Closed-cell foam sheet is an effective and easy to install material to use between the pipe and inner surface of the microsphere insulation system. This approach allows the microsphere insulation system to be removed and reinstalled on lines that are sometimes moved to new areas.

All references cited herein are hereby incorporated by reference to the extent not inconsistent with the disclosure herein. Although the description herein contains many specificities, these are intended for illustration and are not intended to limit the scope of the invention. For example, shapes, materials and applications other than those specifically illustrated are included in the invention.

We claim:

1. A cryogenic insulation system, for use in cryogenic applications, comprising a form which is evacuated or filled with gas, said form selected from the group consisting of: a pre-existing annular space, a flat panel and a curved form, said form filled with microsphere particles, wherein at least some of the microspheres are not coated with a material to reduce radiation heat transfer, and wherein the filled form does not contain density gradients as a result of the fluidic motion of the microspheres.

2. The insulation system of claim 1, wherein the microsphere particles are glass.

3. The insulation system of claim 1, wherein the microsphere particles comprise up to 50% by volume of one or more opacifiers selected from the group consisting of: particles coated with a material to reduce radiation heat transfer and a separate opacifier material.

4. The insulation system of claim 1, wherein the microsphere particles are non-uniformly sized.

5. The insulation system of claim 1, wherein the microsphere particles are uniformly sized.

* * * * *

US006858280C1

(12) INTER PARTES REEXAMINATION CERTIFICATE (772nd)
United States Patent
Allen et al.

(10) Number: US 6,858,280 C1
(45) Certificate Issued: Dec. 19, 2013

(54) MICROSPHERE INSULATION SYSTEMS

(75) Inventors: Mark S. Allen, Lakewood, CO (US); Gary S. Willen, Boulder, CO (US); Robert A. Mohling, Boulder, CO (US)

(73) Assignee: Technology Applications, Inc., Boulder, CO (US)

Reexamination Request:
No. 95/001,448, Sep. 20, 2010

Reexamination Certificate for:
Patent No.: 6,858,280
Issued: Feb. 22, 2005
Appl. No.: 10/377,085
Filed: Feb. 26, 2003

Related U.S. Application Data

(60) Provisional application No. 60/359,734, filed on Feb. 26, 2002.

(51) Int. Cl.
*E04B 1/80* (2006.01)
*F16L 59/06* (2006.01)
*F16L 59/065* (2006.01)
*F17C 13/00* (2006.01)
*E04B 1/74* (2006.01)

(52) U.S. Cl.
CPC ............... *F17C 13/001* (2013.01); *E04B 1/803* (2013.01); *F16L 59/065* (2013.01); *Y02B 80/12* (2013.01)
USPC ............................................................. 428/69

(58) Field of Classification Search
None
See application file for complete search history.

(56) References Cited

To view the complete listing of prior art documents cited during the proceeding for Reexamination Control Number 95/001,448, please refer to the USPTO's public Patent Application Information Retrieval (PAIR) system under the Display References tab.

*Primary Examiner* — Elizabeth McKane

(57) ABSTRACT

A new insulation system is provided that contains microspheres. This insulation system can be used to provide insulated panels and clamshells, and to insulate annular spaces around objects used to transfer, store, or transport cryogens and other temperature-sensitive materials. This insulation system provides better performance with reduced maintenance than current insulation systems.

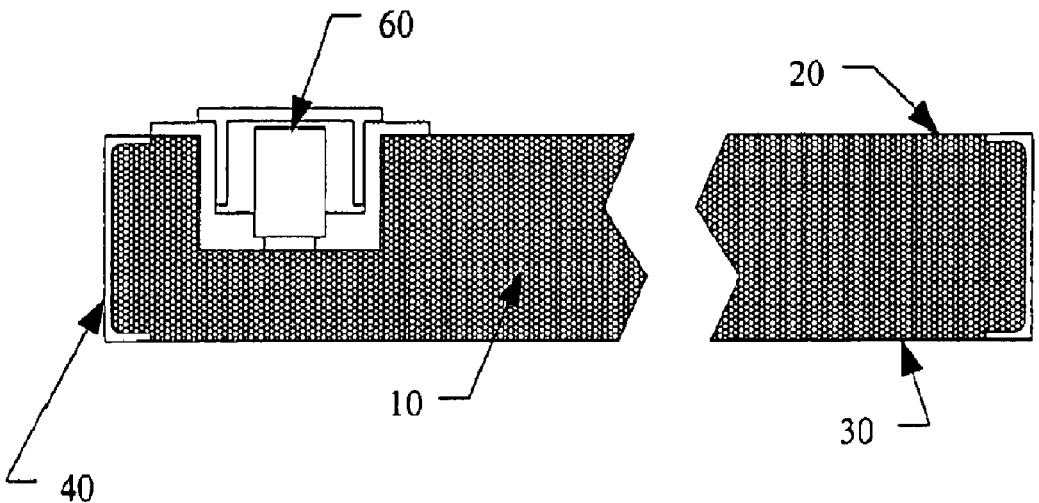

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5 are cancelled.

New claims 6 and 7 are added and determined to be patentable.

*6. The insulation system of claim 1, wherein the form comprises a form frame having stainless steel front and back portions and fiberglass sides.*

*7. A cryogenic insulation system, for use in cryogenic applications, comprising a form which is evacuated or filled with gas, said form selected from the group consisting of: a pre-existing annular space, a flat panel and a curved form, said form filled with microsphere particles, wherein at least some of the microspheres are not coated with a material to reduce radiation heat transfer, wherein the filled form does not contain density gradients as a result of the fluidic motion of the microspheres, wherein the form comprises top and bottom face sheets bonded to one or more low thermal conductivity edges to form a panel envelope containing said microsphere particles, and wherein said top and bottom face sheets are connected via a cryogenic grade epoxy.*

\* \* \* \* \*